United States Patent
Parsa (10) Patent No.: US 7,318,858 B2
(45) Date of Patent: Jan. 15, 2008

(54) GAS SEPARATOR FOR PROVIDING AN OXYGEN-ENRICHED STREAM

(75) Inventor: Komad Parsa, Laguna Niguel, CA (US)

(73) Assignee: Parsa Investment, L.P., Laguna Niguel, CA (US)

( * ) Notice: Subject to any disclaimer, the term of this patent is extended or adjusted under 35 U.S.C. 154(b) by 1 day.

(21) Appl. No.: 11/025,761

(22) Filed: Dec. 28, 2004

(65) Prior Publication Data

US 2005/0142048 A1 Jun. 30, 2005

Related U.S. Application Data

(63) Continuation-in-part of application No. 10/679,993, filed on Oct. 6, 2003, now Pat. No. 6,895,945, and a continuation-in-part of application No. 10/680,603, filed on Oct. 6, 2003, which is a continuation-in-part of application No. 10/402,279, filed on Mar. 27, 2003, which is a continuation of application No. 10/194,628, filed on Jul. 12, 2002, now Pat. No. 6,585,809.

(51) Int. Cl.
*B03C 3/011* (2006.01)

(52) U.S. Cl. ................ 96/60; 95/73; 95/78; 96/62; 96/66; 96/74

(58) Field of Classification Search ............ 96/7, 96/8, 10, 15, 16, 60–67, 224, 74; 95/57, 95/78, 73
See application file for complete search history.

(56) References Cited

U.S. PATENT DOCUMENTS 3,154,682 A * 10/1964 Hartz et al. ............ 95/78

| 3,602,202 | A | 8/1971 | Kobayashi |
| 3,672,341 | A | 6/1972 | Smith et al. |
| 3,792,690 | A | 2/1974 | Cooper ............ 123/3 |
| 3,826,063 | A | 7/1974 | Festner |

(Continued)

FOREIGN PATENT DOCUMENTS

CN 1066404 11/1992

(Continued)

OTHER PUBLICATIONS

"Applications Of Air Ionization For Control Of VOCs And PM" by Dr. Stacy L. Daniels, Director of Research, Precision Air, A Division Of Quality Air Of Midland, Inc. Paper #918 (Session AB-7a: Advances in, and Evaluation of, IAQ Control; pp. 1-16; (2001 or later).

*Primary Examiner*—Richard L. Chiesa
(74) *Attorney, Agent, or Firm*—O'Melveny & Myers LLP (57) ABSTRACT

A system for separating oxygen from air operates at a pressure less than atmospheric. The oxygen separation system includes an entry port for ambient air, and at least two separate exhaust ports through which separate exhaust streams are drawn by separate suction sources. The oxygen separation system further includes a low-energy ionization portion that favors creation of molecular oxygen ions, and a higher-energy portion disposed between the ionization portion and one of the exhaust ports. A plurality of gas-permeable electrodes are charged to different voltages to provide the different portions inside the separator. An exhaust stream taken from the anode side of the separator is enriched in oxygen relative to ambient air.

18 Claims, 4 Drawing Sheets

U.S. PATENT DOCUMENTS

| | | | |
|---|---|---|---|
| 3,961,609 A | 6/1976 | Gerry | |
| 4,064,840 A | 12/1977 | Vierling | |
| 4,066,526 A * | 1/1978 | Yeh | 204/554 |
| 4,231,766 A | 11/1980 | Spurgin | |
| 4,313,739 A * | 2/1982 | Douglas-Hamilton | 95/79 |
| 4,319,979 A | 3/1982 | King | |
| 4,422,824 A | 12/1983 | Eisenhardt | |
| 4,919,690 A * | 4/1990 | Lovelock | 95/78 |
| 5,024,685 A * | 6/1991 | Torok et al. | 96/43 |
| 5,051,113 A | 9/1991 | Nemser | |
| 5,097,665 A | 3/1992 | Kammel | |
| 5,450,822 A | 9/1995 | Cunningham | |
| 5,540,761 A | 7/1996 | Yamamoto | |
| 5,591,253 A * | 1/1997 | Altman et al. | 96/61 |
| 5,649,517 A | 7/1997 | Poola | |
| 5,678,518 A | 10/1997 | Grothe et al. | |
| 5,855,652 A | 1/1999 | Talley | |
| 5,868,918 A | 2/1999 | Adler et al. | |
| 5,913,809 A | 6/1999 | Erlichman et al. | |
| 5,937,799 A | 8/1999 | Binion | |
| 5,942,026 A | 8/1999 | Erlichman et al. | |
| 5,961,693 A | 10/1999 | Altman et al. | |
| 5,972,077 A | 10/1999 | Judkins et al. | |
| 5,992,397 A | 11/1999 | Hideaki et al. | |
| 6,110,242 A | 8/2000 | Young | 55/337 |
| 6,302,944 B1 | 10/2001 | Hoenig | |
| 6,375,714 B1 | 4/2002 | Rump et al. | |
| 6,543,428 B1 | 4/2003 | Blandino et al. | |
| 6,563,110 B1 | 5/2003 | Leri | |
| 6,585,809 B1 * | 7/2003 | Parsa | 96/16 |
| 6,675,780 B1 | 1/2004 | Wendels et al. | |
| 6,773,489 B2 | 8/2004 | Dunn | 95/78 |
| 6,895,945 B2 * | 5/2005 | Parsa | 123/539 |
| 7,252,810 B2 * | 8/2007 | Parsa | 422/186.04 |
| 2004/0007134 A1 * | 1/2004 | Parsa | 96/16 |
| 2004/0065306 A1 * | 4/2004 | Parsa | 123/539 |
| 2004/0065594 A1 * | 4/2004 | Parsa | 209/400 |
| 2005/0142048 A1 * | 6/2005 | Parsa | 422/186.04 |
| 2005/0178270 A1 | 8/2005 | Ito et al. | |

FOREIGN PATENT DOCUMENTS

| | | |
|---|---|---|
| EP | 0983786 | 3/2000 |
| JP | 63049225 | 3/1988 |
| JP | 63-158114 | 7/1988 |
| JP | 63242320 | 10/1988 |
| JP | 2001070743 | 3/2001 |
| JP | WO 03/082443 | 10/2003 |

* cited by examiner

GAS SEPARATOR FOR PROVIDING AN OXYGEN-ENRICHED STREAM

RELATED APPLICATION

This application is a continuation-in-part of application Ser. No. 10/679,993, now U.S. Pat. No. 6,895,945, and Ser. No. 10/680,603, both filed Oct. 6, 2003, and both of which are continuation-in-part applications of 10/402,279, filed Mar. 27, 2003, which is a continuation of Ser. No. 10/194,628, filed Jul. 12, 2002, now U.S. Pat. No. 6,585,809. All of the foregoing applications are specifically incorporated herein, in their entirety, by reference.

BACKGROUND OF THE INVENTION

1. Field of the Invention

The present invention relates to a method and system for a gas separator for separation of gas mixtures into outputs having higher concentrations of selected constituent gases, and particularly to a continuous gas separator that operates at relatively low pressures, such as partial atmospheric pressure, or less.

2. Description of Related Art

It is generally desirable to separate constituent gases of a gaseous mixture for a variety of applications. For example, the constituent gases of oxygen, nitrogen, carbon dioxide, argon, etc., are often separated from air, using numerous different methods. Methods for such separation often require the use of massive and/or complex equipment, and consume a large amount of energy. Consequently, bottled gas (pressurized or liquefied) is predominantly used for many smaller-scale applications in which a relatively pure gas is required. Except for a few specialized industrial processes, continuous, on-demand gas separation methods that use ambient air as a feedstock are generally too expensive and/or not technically feasible for many applications in which gaseous separation may be beneficial.

For example, for combustion engine applications, it may be beneficial to enrich intake air with oxygen, to enable increased power or efficiency. Separating oxygen and nitrogen from air, however, presents a difficult challenge. Oxygen has only a slightly greater electronegativity than nitrogen, and under many conditions oxygen and nitrogen may both be ionized negatively in the presence of an electric field or other ionizing radiation. For example, ionization of both oxygen and nitrogen can occur in the ionosphere under the influence of ultraviolet light. However, mere application of a static electric field to an ionized mixture may not achieve the desired degree of separation under many conditions.

It is desirable, therefore, to optimize ionization and separation of oxygen from air in a gas separator of the type disclosed in the parent applications, with minimal or no increase in cost or complexity. An improved gas separator may be operated, for example, to enhance the oxygen content of intake air for an internal combustion engine.

SUMMARY OF THE INVENTION

The invention provides an improved method and system for separating constituents of gas mixtures from ambient air in a continuous process, and in particular, providing a continuous stream of oxygen-enriched (or oxygen-deficient) air from a compact device. The method may be implemented using lightweight, relatively inexpensive equipment similar to that disclosed in the above-referenced parent application, with modifications as disclosed herein. The invention is believed to provide improved separation of oxygen from air. The improved gas separator may be used with a system for conditioning intake air of a combustion engine, or any other suitable application.

In an embodiment of the invention, two or more electric fields and electrostatic elements are used. The effect of these electric fields and elements together is to quickly remove negative oxygen ions after they are formed, and to keep the gas in the ionization chamber at a relatively low temperature. Molecular oxygen has an exothermic electron affinity, that is, it releases heat when ionized negatively (141 kJ/mol). Molecular nitrogen has an electronegativity only slightly less than oxygen, but has an endothermic electron affinity (−7 kJ/mol). To promote ionization of oxygen but not nitrogen, it is desirable to keep the ionization energy and temperature relatively low, and to remove oxygen quickly from the ionization chamber. The combination of these effects should enhance oxygen output at the anode side of the separator system.

In an embodiment of the invention, a system for separating a gaseous constituent from a gaseous mixture includes a substantially sealed container extending between a first exhaust port and a second exhaust port. An entry port for a gas mixture to be separated opens into the container, between the first exhaust port and the second exhaust port.

The entry port opens into a relatively low-energy ionization chamber disposed between oppositely-charged electrodes. The low-energy ionization chamber should be sufficiently energetic to ionize molecular oxygen, but without also ionizing nitrogen to the same degree. Because of the negative electron affinity of nitrogen, maintaining a cool temperature in the chamber should help promote selective ionization of oxygen.

The electrodes in the ionization chamber may be generally planar or sheet-like, with a primary surface of relatively large area and many small openings to allow the passage of gas. In the alternative, the electrodes may be configured as wire or needle arrays, or as contoured sheets with many small openings. Each electrode has a second surface facing either an exhaust plenum, or an adjacent portion of the gas flow container.

In an embodiment of the invention, air is drawn into the ionization chamber by applying suction at the exhaust ports. By throttling the entry port, a considerable pressure and temperature drop may occur as the gas enters the ionization chamber. For example, the temperature in the ionization chamber may be maintained at less than about 20° C. and the pressure at substantially less than one atmosphere, for example, less than about 0.3 atmospheres.

Surprisingly, for separation of oxygen from air, a relatively low ionization energy applied to the gas in the ionization chamber may be more effective in promoting ionization of molecular oxygen relative to molecular nitrogen. In an embodiment of the invention, a relatively low-voltage electric field is applied between two gas-permeable electrodes disposed at opposite ends of the ionization chamber. For example, an electric field of 220 V DC may be applied between gas-permeable electrodes spaced about six inches apart, providing a field strength of about 40 V/in. In the alternative, or in addition, air in the chamber may be exposed to an ultraviolet light for ionization. It is believed that under conditions of relatively low temperature and low ionization energy, formation of negative oxygen ions will be favored relative to negative nitrogen ions in air. As the temperature and ionization energy increase, however, the proportion of negative nitrogen ions in the ionization chamber may increase, if ionized oxygen is not exhausted quickly enough from the chamber.

Ionization of molecular oxygen is exothermic, while ionization of molecular nitrogen is slightly endothermic. Accordingly, maintaining a low temperature in the ionization chamber should favor ionization of oxygen, but as this occurs, the air in the chamber will be heated. It is desirable, therefore, to maintain a low temperature in the chamber. This may be accomplished, for example, by cooling the chamber using refrigeration, or cooling the air prior to entry into the ionization chamber.

However, if only a relatively small increase in oxygen concentration is needed, a low temperature may be maintained merely by maintaining an adequate mass flow rate through the chamber. At a sufficiently high rate of flow, heating caused by ionization of oxygen may cause only a small temperature rise in the ionization chamber, and limit the thermal energy available for ionization of nitrogen.

Opposite ends of the ionization chamber are oppositely charged, with a positive electrode at a first end of the ionization chamber, and a negative electrode at a second end of the ionization chamber. Negative ions produced by an electric field between the electrodes are attracted to the gas-permeable positive electrode. Under conditions as described above, negative ions will include a molar ratio of oxygen ions to nitrogen ions that is higher than the natural ratio of oxygen molecules to nitrogen molecules in air. Consequently, simultaneously suctioning air in separate streams from both ends of the ionization chamber should result in a mixture being suctioned through the positive electrode that is proportionally richer in oxygen than the incoming mixture.

In addition, the oxygen-rich stream suctioned from the positive side of the ionization chamber may be suctioned through at least one additional electrode having a higher positive voltage than the positive electrode of the ionization chamber. More preferably, the oxygen-rich stream is suctioned through multiple electrodes placed in series, with each electrode in the series having a more positive charge than each upstream electrode. The series of permeable electrodes may be arranged in the container so that each of the additional electrodes provides an electric field of the same polarity relative to the direction of gas flow in the container.

The voltage across the electrode bank may be divided among each portion of the container between adjacent electrodes, thereby producing a unidirectional, static electric field through multiple portions along the length of the container. Compared to the voltage applied to the initial electrodes, the applied positive voltage may be much higher downstream of the initial ionization chamber. For example, an applied voltage in the range of about four to fifteen kV/inch may be useful downstream of the low-energy ionization chamber.

Thus, the oxygen-rich exhaust stream may be passed through a series of electrodes of increasing positive charge downstream of an initial ionization chamber. An oxygen-deficient exhaust stream may be removed from the negative-electrode end of the ionization chamber, without further treatment. In the alternative, the downstream positive electrode may be omitted.

According to a method of the invention, a gas mixture is continuously introduced into the ionization chamber. The gas mixture in the ionization chamber and container downstream of the ionization chamber is maintained at a controlled pressure that is generally less than atmospheric pressure, for example, a low vacuum pressure. In an embodiment of the invention, gas pressure is maintained by adjusting a gas input valve connected to the volume between the electrodes, depending on the exhaust rate. By throttling the input valve while pumping gas out the exhaust port, a continuous flow of low-pressure gas can be drawn through the volume between the electrodes and out the separate exhaust ports. In the alternative, the entry port for the gas separation container may be maintained in a fixed state, and flow through the device may be controlled via the exhaust ports. For example, the exhaust flow may be varied by controlling the pumping speed of an exhaust pump, and/or by using an adjustable valve in the exhaust. In addition, or in the alternative, the entry port may comprise an array of small holes or voids that permits the gas mixture to enter into the container under laminar flow conditions. It is believed that maintaining laminar flow conditions through the container, electrodes, and exhaust plenums will increase the effectiveness of the device.

Separation of oxygen from the mixture proceeds as the air between the electrodes is ionized. Creation of negative $O_2$ ions should predominate when the electric field is much less than required to produce an arc discharge, the pressure is, less than atmospheric, and the temperature is less than room temperature. For example, at less than atmospheric pressure and less than 20° C., creation of oxygen ions may be favored in an electric field less than about 15 Volts per cm. Downstream of the anode, electrodes charged to higher voltages than the anode of the ionization chamber should aid in the separation of oxygen ions from the ionization chamber. In addition, ionized gas should be quickly removed from the ionization chamber, to enhance continuous formation of new oxygen ions.

In an embodiment of the invention, an oxygen separation system (enhancement system) is connected to supply oxygen-enriched air to the air intake manifold of an internal combustion engine. The system may further include an internal combustion engine having an air intake manifold connected to receive oxygen-enriched air from the first exhaust port of the oxygen separation system. During engine operation, engine vacuum may be used to draw air through the oxygen separation system and its first exhaust port into the air intake manifold.

In addition, an air metering system may be installed in the air line between the first exhaust port and the air intake manifold, to control the total volume of air and extent of oxygen enrichment in the air supplied to the engine. If present, the air metering system may comprise two inlets, a mixing portion, and an outlet. One of its two inlets may be connected to the oxygen separation system and the other may receive ambient air. The outlet may be connected to the air intake manifold. One or more flow control valves may be configured to control the flow through one or both inlets.

The flow control valve may be controlled by an electronic control system. The electronic control system may also be connected to control the pump speed, if a pump is present; and/or to control the voltage supplied to the electrodes of the oxygen separation system.

The second exhaust port of the oxygen-separation system may be connected to the engine exhaust, so as to draw air through the oxygen-separation system and out the second exhaust port. In the alternative, the second pump may discharge air from the second exhaust port into the atmosphere. If present, the second pump may also be controlled by the electronic control system.

A static high-voltage source may be connected to the electrodes for providing the static electric field between the gas-permeable electrodes of the oxygen separation system. The high-voltage source may be powered by the engine's electrical system.

The voltage may be held constant, and the first exhaust port connected to the engine vacuum. The ports of the oxygen separator may be configured so that the oxygen separation system reaches its maximum oxygen output when the engine draws its maximum vacuum. When voltage is fixed, oxygen output from the oxygen separation system will generally increase as pressure in the ionization chamber is reduced below atmospheric. This occurs because ionization of oxygen, and free movement of oxygen ions towards the anode side, both increase as pressure is reduced. But below a certain optimal pressure, which will vary depending on the design of the oxygen separation system, the mass flow of oxygen decreases as the total oxygen throughput decreases with decreasing pressure. Thus, the system may be designed so that the optimal pressure is obtained in the oxygen separator—coinciding with maximum oxygen output—when the engine draws its maximum vacuum.

A more complete understanding of the method and system for gas separation, and its application to method and system for conditioning intake air for an engine, will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
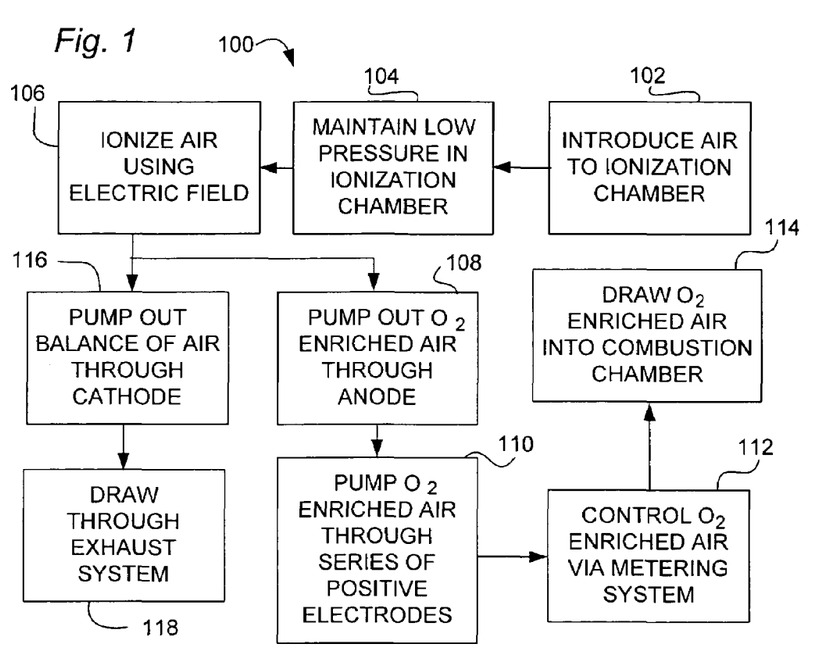
FIG. 1 is a flow diagram showing exemplary steps of a method for gas separation according to the invention.

The present invention provides a method and system for separation of oxygen from air using a low-pressure, asymmetric separator apparatus. FIG. 1 shows exemplary steps of a method 100 for providing an oxygen-enriched stream from air. Method 100 may be performed using any of the systems disclosed herein, or any other suitable equipment. Steps 102, 104, 106, 108, and 116 are performed continuously and concurrently as a continuous method. Steps 112, 114, and 118 are optional, and apply to application of a separator according to the invention in an intake system for an internal combustion engine.

At step 102, air is introduced through an entry port into an enclosed ionization chamber. The pressure of the introduced air may be reduced and regulated by a throttle valve in-line with the entry port. In the alternative, the entry port has a fixed flow capacity. An entry plenum may be used to introduce the inlet air under laminar (or less turbulent) flow conditions. The ionization chamber comprises oppositely-charged electrodes of static polarity separated by a volume for containing the gaseous mixture. One of the electrodes is a cathode and the other is an anode.

At step 104, a low pressure is maintained in the ionization chamber. "Low pressure" refers to a pressure less than atmospheric, such as between about 1-29 inches of mercury vacuum, or between about 0.05 and 0.95 atmospheres. Low pressure is maintained by controlling the exhaust flows relative to the entry port until the desired pressure is maintained in the ionization chamber. The optimal pressure and temperature will depend on the desired degree of oxygen enhancement, the electrode voltage and spacing, energy available for cooling and pumping, and perhaps on other factors.

For separation of oxygen from air, air in the ionization chamber should be maintained at a relatively cool temperature, for example, less than about 20° C. Advantageously, expansion of incoming air through a throttling inlet port may provide adequate cooling. Active refrigeration may also be provided to cool air in the ionization chamber. The positive electron affinity of molecular oxygen should favor selective ionization of oxygen instead of nitrogen as temperature is decreased. However, practical considerations may limit the need or feasibility of maintaining the lowest possible temperature. For some applications, a temperature in the range of about zero to 20° C. should be adequate At step 106, molecular oxygen in the air between the anode and cathode is ionized. Some ionization of other species may also occur, but taking into account the relative electronegativity and electron affinity of oxygen and nitrogen, conditions in the chamber should be maintained such that the proportion of ionized oxygen to ionized nitrogen in the ionization chamber is greater than the oxygen/nitrogen ratio in ambient air.

To better achieve selective ionization of oxygen, ionization may be driven by a relatively low-energy source, for example, a low voltage electric field between the anode and cathode, by a separate radiation source, or by some combination of radiation and an electric field. For separation of oxygen from air, a relatively low-voltage static electric field in the range of about 10 to 100 V/in, for example, about 40 V/in, is believed desirable in the ionization chamber. As a result of the ionization, air that is enriched in molecular oxygen should be attracted towards an anode side of the ionization chamber. The balance of the mixture may be drawn out through or adjacent to the cathode at an opposite end of the ionization chamber, and may be supplied to an automotive exhaust system (step 118) or exhausted to atmosphere.

At step 108, gas adjacent to the anode is pumped out and discharged from the ionization chamber. Discharge may be performed by applying suction to an exhaust plenum disposed against the anode, using any suitable vacuum system or vacuum pump. Concurrently, at step 116, gas adjacent to the cathode is pumped out and discharged from the ionization chamber. This gas should be deficient in oxygen, and enriched in nitrogen. Again, an exhaust plenum disposed against the cathode and suctioned by a suitable pump may be used to carry out this step.

Gas pumped from the cathode is pumped in a separate gas stream segregated from gas pumped from the anode. Mass flow of gas into the ionization chamber should be equal to the sum of mass flows pumped from the anode and cathode. Exhaust suction should be applied continuously, so as to create sufficient replenishment of ionized air with replacement air, and maintain an equilibrium that favors creation of oxygen ions. Under proper conditions, gas adjacent to the anode will be enriched in oxygen.

At step 110, gas discharged through the anode is directed through one or more additional electrodes, each having a higher positive voltage than the anode. The additional electrodes should also be gas permeable, and may be disposed in the same housing as the ionization chamber downstream of the anode. Further details concerning configuration of the additional electrodes is provided elsewhere in the specification. After passing through the additional positive electrodes, the stream of oxygen enriched air is ready for use in the desired application, such as for conditioning intake air of a combustion engine.

For many applications, it may be beneficial to control the total amount of oxygen supplied to the engine. Accordingly, at optional step 112, a suitable control system may be used to control the amount of oxygen supplied, depending on engine operating conditions. For example, under higher load conditions, the amount of oxygen supplied may increase. Various systems may be used to accomplish this step. One example is a feedback-controlled air metering system that may be used to blend the oxygen enriched air from the oxygen separation system with ambient air, upstream of the engine air intake port. An adjustable valve, or any other suitable control mechanism, may be used to control the proportion of oxygen-enriched air to ambient air in the inlet stream. The air metering system may blend the oxygen-enriched stream with ambient air or other gas to control the oxygen ratio in a supply stream.

At step 114, air that is enriched in oxygen may be drawn into the combustion chamber of an internal combustion engine. It is believed that the total percentage of oxygen in the combustion chamber should not be too great for engines designed to operate on air, but will vary depending on engine design. Likewise, at step 118, the nitrogen-enriched stream may be supplied to an engine exhaust system, where it may be used to positive effect.

Figure 2:
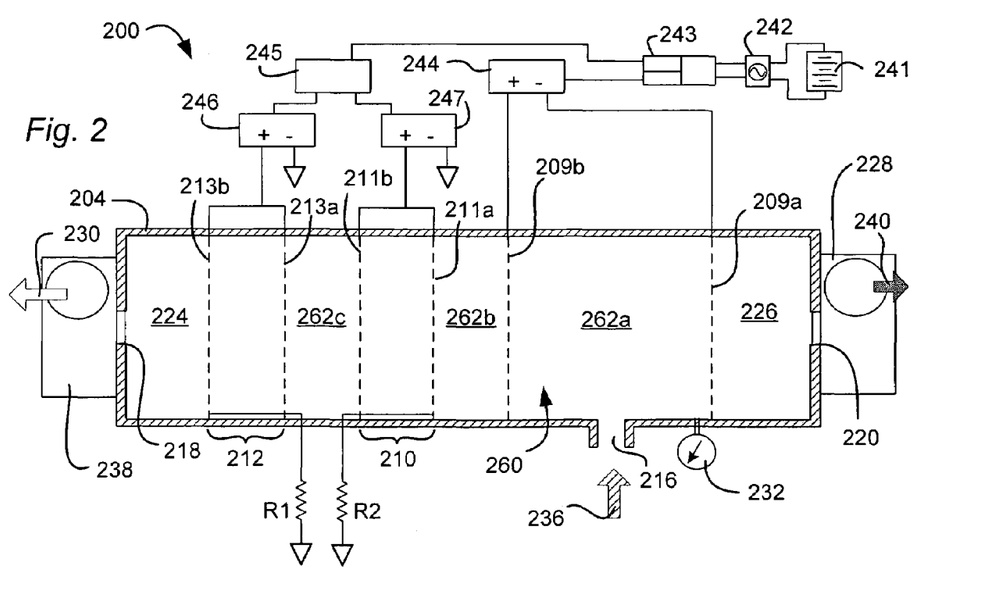
FIG. 2 is a diagram showing an exemplary system for gas separation.

FIG. 2 shows a system 200 according to the invention. System 200 and its elements are shown in a simplified, diagram format, with an enclosure 204 shown in cutaway view. One of ordinary skill in the art will be able to select and assemble a system according to the invention from FIG. 2 and the accompanying description herein.

A gas-handling portion of system 200 is disposed inside enclosure 204. The enclosure may be made of any suitable non-conductive material, for example, plastic. The enclosure 204 may have any suitable shape, and defines a container 260 between opposing exhaust ports 218, 220, with an entry port 216 at a location intermediate between the exhaust ports. To save space or to fit in a particular location, the enclosure may be curved or contoured along its length. In a prototype embodiment of the invention, enclosure 204 comprised a 14-inch length of ASTM D3034, 8-inch diameter PVC pipe, with its ends sealed by metal plates.

A low-pressure ionization chamber 262a is disposed in enclosure 204, in fluid communication with entry port 216. The ionization chamber comprises a space between oppositely-charged, gas permeable electrodes 209a, 209b at opposite ends of the ionization chamber. Electrode 209a is negatively charged and electrode 209b is positively charged, providing an electric field with a relatively small voltage gradient across the ionization chamber 262a. For example, the electric field in the ionization chamber may be in the range of about 30-50 V/in. An exhaust plenum 226 is disposed on a side of cathode 209a distal from entry port 216.

One or more gas-permeable electrodes 211a-b, 213a-b are disposed across container 260 on a side of anode 209b distal from entry port 216. Electrodes 211a-b may comprise an electrode bank 210 having a first charge more positive than anode 209b. Electrodes 213a-b may comprise a second electrode bank 212 having a second charge more positive than bank 210. To better attract molecular oxygen ion created in the ionization chamber, electrode banks 210 and 212 may be charged to relatively high positive voltages, depending on the desired degree of oxygen enhancement and other design factors.

Accordingly, relatively strong electric fields may exist in portions 262b and 262c of container 260, between respective electrodes of increasingly positive charge. For example, the electric field strength in these portions downstream of the oxygen ionization portion may be in the range of about 2 to 15 kV/inch.

The electrodes and banks as depicted in FIG. 2 are merely exemplary. Any number of banks 210, 212 may be disposed across the container downstream of the anode 209b. In the alternative, the additional banks 210, 212 may be omitted entirely. Likewise, each bank may comprise any number of parallel electrodes, including just one electrode.

In selecting an appropriate spacing and configuration of the electrodes, fluid dynamic effects created by pump suction should be considered, as well as the electric field between the electrodes. For example, electrode banks 210, 212 should be spaced far enough apart from each other, and from anode 209b, to avoid arcing during operation. The spacing of the electrodes should also provide enough space for separation of ions from the gaseous mixture under the combined influence of an electric field and opposing exhaust suctions. At the same time, the electrode banks should not be spaced too far apart, as this may reduce the electrostatic attraction of oxygen ions to the positive electrodes and make the enclosure 204 unnecessarily bulky.

By way of example, and not by way of limitation, in an embodiment of the invention, the opposing electrodes 209a-b of the ionization chamber were spaced approximately 6 inches apart. Electrode bank 210 was spaced about 2 inches from anode 209b, and comprised 2 parallel electrodes spaced about 2 inches from one another. Electrode bank 212 was spaced about 2 inches from bank 210. Electrode bank 212 comprised 2 electrodes spaced about 2 inches from one another. A space of approximately 2 inches was provided between each of electrodes 213b, 209a and its respective nearest exhaust port 218, 220. The electrodes were charged as described below in connection with the electrical system of separator 200.

Entry port 216 is configured for discharging a gaseous mixture for ionization directly into the ionization chamber 262a. Entry port 216 may comprise a discrete entry port into the ionization chamber, with or without a series-connected entry valve (not shown). To promote cool temperatures in the ionization chamber, the entry port may be configured to cause expansion of gas as it enters the enclosure 204, such as by incorporating an expansion nozzle. In addition, or in the alternative, entry port 216 may be configured as a plurality of small orifices that serve as an entry plenum to reduce the turbulence of air admitted into the ionization chamber 262a.

In the illustrated embodiment, the entry port 216 is open to the environment, to admit ambient air. In the alternative, the entry port may be surrounded by a plenum housing (not shown) for control of the entry gas. The plenum housing may have an inlet that is connected in series with an adjustment valve (not shown). In a prototype embodiment, a single discrete entry port about 0.75 inches in diameter was used, without an adjustment valve. If present, an adjustment valve may be used to throttle gas flow into the ionization chamber, thereby providing for regulation of gas pressure in portion 262a (ionization chamber). If no entry valve is provided, pressure may be controlled by controlling the speed of the exhaust pumps, or by providing an adjustment valve on one or more of the exhaust ports.

In the illustrated embodiment, pumps 238, 228 are connected to exhaust ports 218, 220, and may be operated to create suction in exhaust plenums 224, 226, respectively. Any suitable vacuum or suction pump may be used, depending on the intended mass flow rate through the system, the desired vacuum pressure in chamber 262a, and the electric field voltage. In a prototype embodiment, pumps 228, 238 comprised 145 mm 2-stage tangential bypass discharge vacuum pumps from Ametek® Lamb Electric of Kent, Ohio.

The flow of gas into and out of system 200 may be controlled by an intake valve (not shown), exhaust valve (not shown), and/or by varying the speed of pumps 228, 238. A gaseous mixture is drawn into the ionization chamber 262a as shown by arrow 236, because of suction provided by pumps 228 and 238. Gas within the chamber 262a is ionized by the electric field between electrode banks 210, 212, and ions of opposite polarity tend to propagate in opposite directions, towards an oppositely-charged one of the electrode banks. A portion of the gas passes through electrodes 209b, 211a-b, and 213a-b, and is discharged through exhaust port 218, as indicated by arrow 230. The balance of gas flow passes through electrode 209a and is discharged through exhaust port 220, as indicated by arrow 240. Provided that chamber 204 is substantially sealed except for the gas ports, the inlet mass flow rate 236 will equal the sum of the exhaust flows 230, 240.

The electrodes are supplied with a desired voltage by DC power source 241, in conduction with suitable transformers or voltage converters. In an embodiment of the invention, power source 241 comprises a 12-Volt battery, such as used for automotive and similar applications. Battery power may be supplied through an alternator (DC-to-AC converter) 242, which converts the 12 V DC supplied by the battery to 110 V AC. Power may be routed through a transformer 243, which supplies 220 V AC power to a rectifier 244. The rectifier, in turn, supplies 220 V DC to electrodes 209a-b. 110 V AC power may also be supplied to a second AC-to-DC converter 245, which supplies 12 or 24 V DC to high-voltage power supplies 246, 247.

Power supply 246 may provide, for example, about 30,000 V positive to bank 212. For further example, about 5000 V positive may be supplied via power supply 247 to bank 210. In a prototype embodiment, appropriate models of DC-to-DC power converters by American High Voltage of Elko, Nev., were used as sources 246, 247. Power converter 247 was designed to produce an output voltage of 0-5000 VDC, in proportion to an input voltage of 0-12 VDC. The foregoing example illustrates the principle of increasingly positive voltage towards the oxygen-enriched side of separator 200, but the invention is not limited to the described voltages. Other voltages may be more or less suitable than the voltages described.

In a prototype system of the type shown in FIG. 2, the exhaust pumps described above were operated at their full design speed, drawing through a single entry port about 0.75 inches in diameter. In this mode, a pressure drop of about 5 inches Hg below atmospheric was measured by gauge 232. An oxygen sensor capable of reading percentage of oxygen in the range of 0-100% was positioned in the exhaust port of exhaust pump 230. The sensor was adjusted to read a concentration of 20% oxygen in ambient air, prior to placing in the exhaust port. Voltage drop at the voltage source 244 stabilized at about 10 V during operation of the pumps. Oxygen content stabilized at a level of about 24% total oxygen at the exhaust pump 240. Hence, the prototype successfully enriched the oxygen content of the exhaust by about 20%, relative to ambient levels.

Figure 3A:
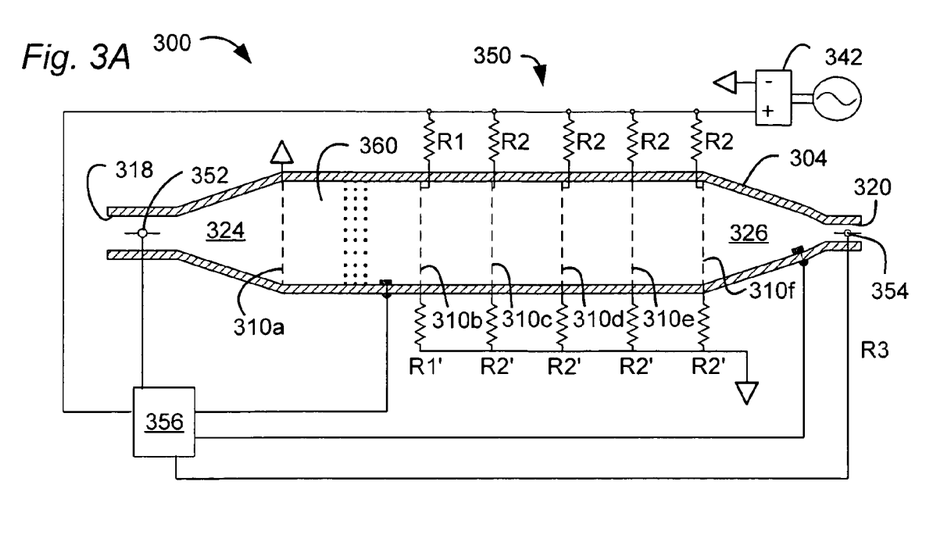
FIG. 3A is a diagram showing an exemplary system for gas separation, according to an alternative embodiment of the invention.

FIG. 3A shows an alternative system 300 for gas separation. Like system 200, system 300 includes a generally tubular enclosure 304 housing a plurality of permeable electrodes 310a-f in a container 360, an entry port 316 and two exhaust ports 318, 320 disposed at opposite ends of the container. Electrodes 310a-f are disposed across container 360, dividing it into a plurality of portions each bounded on opposing ends by an electrode. Differences from system 200 include tapered exhaust ports 318, 320 to promote laminar flow, a voltage divider in the parallel circuit 350, exhaust control valves 352, 354, and controller 356. It should be appreciated that system 300 exemplifies various new features and modifications to system 200, and it is not necessary that all of these new features be used together at once. A system according to the invention may be constructed by selecting from these new features and modifications as desired.

Electrodes 310a-f may be connected in parallel from circuit 350. Resistor R1 may have a substantially lower value than resistors R2, while the sum of R1 and R1' should be substantially equal to the sum of R2 and R2'. Resistors R2 may be selected to have the same value, or decreasing values away from voltage source 342. High voltage source 342 into may thus be divided into equal (or if desired, unequal) increments. The voltage across electrodes 310a, 310b may be controlled to be relatively, low to promote formation of molecular oxygen ions in a low energy environment. In comparison, electrodes 310c-f may be provided with increasingly higher positive voltages to attract oxygen ions generated between electrodes 310a, 310b. High voltage source 342 may comprise any suitable source of high-voltage DC current.

Thus, for example, if voltage source 342 provides an output voltage of 40,200 V, this may be divided equally by resistors R2 into increments of 10,000 V each and by resistor R1 into a 200 V increment. Electrode 310a, when connected to circuit 350 as shown, will be the most negatively charged of electrodes 310a-f. Electrode 310b will be about 200 V more positive than electrode 310a, while being about 10,000 V more negative than electrode 310c; electrode 310c will be about 10,000 V more negative than electrode 310d; and so on down the sequence of electrodes to the most positive electrode 310f.

Thus, an electric field of controlled magnitude may be generated along the length of container 360. A relatively low-voltage electric field should favor ionization of oxygen relative to nitrogen in a portion of the separator system proximal to the entry port. In addition, capture and separation of negative oxygen ions in a portion downstream of anode 310b distal to the entry port should be promoted by the presence of relatively high positive-voltage electrodes in the distal portion.

Systems 300 or 200 may be used without dedicated exhaust pumps in a system, such as an internal combustion engine, that generates an independent source of suction. Lacking dedicated exhaust pumps, flow through system 300 may be controlled by valves 352, 354 connected in series with one or more of the exhaust ports. Exhaust port 318 may have a higher flow capacity than port 320, depending on the gas mixture to be separated and the intended purity of separation. For example, a ratio of 4:1 in the flow capacity of port 318 to 320 may be useful for separation of oxygen from air. The ratio may be less; but preferably should not be less than 1:1.

System 300 may be configured as a component for installation in a more complex assembly, such as an internal combustion engine. For such applications, it may be particularly useful to configure system 300 for electronic control, either by a controller in the more complex assembly, and/or by a dedicated controller 356. System 300 may be configured for automatic control in various ways. Generally, temperature, electric field or other ionization source, pressure, and flow rates may be controlled to produce a desired output.

Figure 3B:
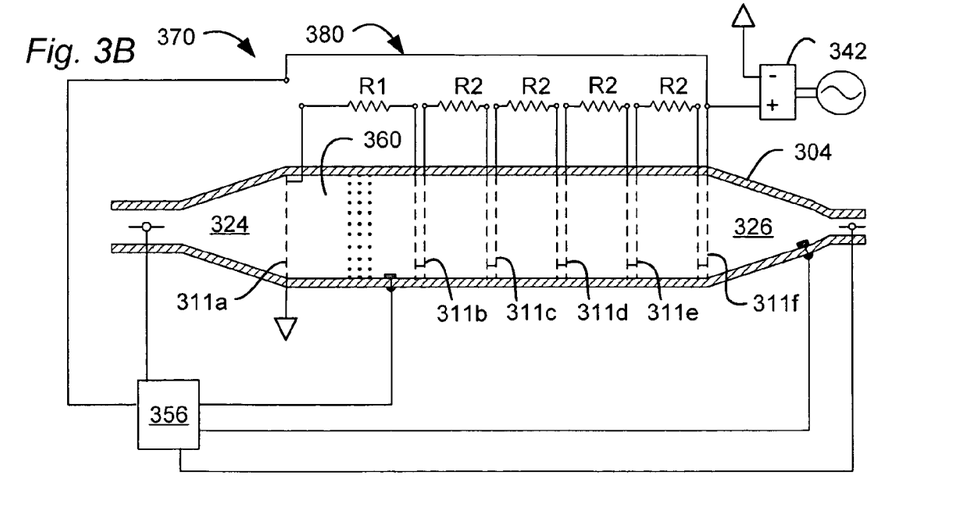
FIG. 3B shows a system like that shown in FIG. 3A, using a serially-connected electrode bank.

FIG. 3B shows a system 370 like system 300 shown in FIG. 3A, but using a serial voltage control circuit 380. Gas permeable electrodes 311a-f are arranged in series from power supply 342 between resistors R2 and R1, respectively. Each electrode 311b-f may comprise dual perforated plates or wire mesh, connected in pairs at a location distal to power source 342. Electrode voltage may thereby be staged from negative to positive across the electrodes 311a-f. One of ordinary skill may select resistors R1, R2 to provide voltage increments according to the example discussed in connection with FIG. 3A above, or other suitable configuration.

Figure 4A:
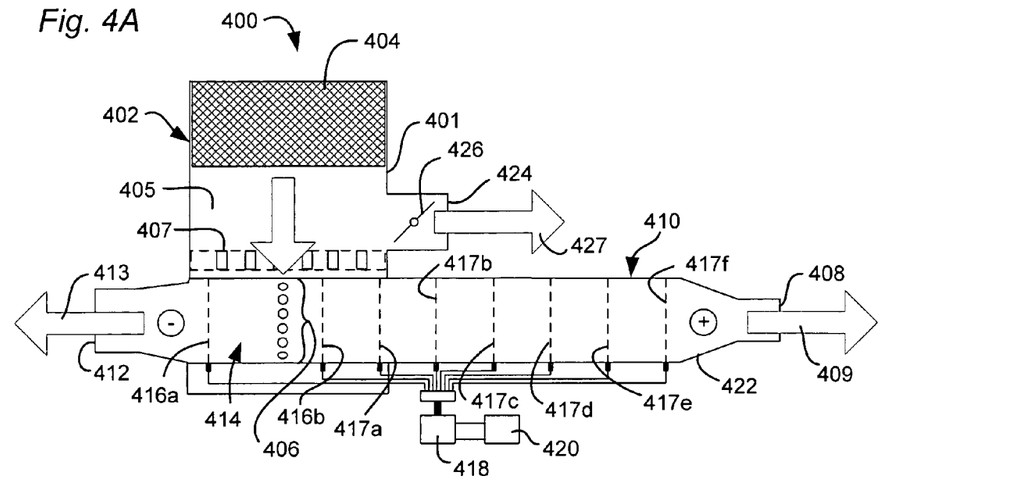
FIG. 4A is a diagram showing an exemplary combined main air intake and asymmetric oxygen separator for use with a combustion engine.

An oxygen separation system of a type described above may readily be incorporated into an airflow system such as may be found in many conventional combustion engines. For example, FIG. 4A shows an integrated air intake and oxygen separation system 400 as may be used to condition intake air for an internal combustion engine.

System 400 comprises a main air intake 402 for holding an air filter 404 upstream and in series with an entry port 406 of an oxygen separation system 410. Main air intake 402 may be configured to provide a plenum 405 downstream of the filter 404 and surrounding the entry port 406. Refrigeration elements as known in the art, for example, a refrigeration coil 407, may be disposed in plenum 405 to cool air prior to entry into entry port 406.

Entry port 406 may comprise one or more openings, which may be configured to cause expansion and cooling of the incoming air. The total area of entry port 406 may be configured so that maximum total oxygen is output from the anode-side exhaust port 408 when the oxygen-enriched exhaust stream 409 reaches its maximum flow rate, which should occur when the internal combustion engine is operating at maximum power. Oxygen separator 410 further comprises cathode-side exhaust port 412 from which an oxygen-depleted exhaust stream 413 may be drawn.

An air container 414 is disposed along an interior of the oxygen separator, connecting the anode-side and cathode-side exhaust ports 408, 412. Container 414 may be divided into portions by a plurality of electrodes, e.g., electrodes 416a-b, 417a-f. Electrodes 416a, 416b define a relatively low-voltage ionization chamber as described above.

Remaining electrodes downstream of the anode 416b side of the ionization chamber, e.g., electrodes 417a-f, may be charged to a relatively high voltage that is more positive than electrode 416b. Electrodes 417a-f may be charged to the same voltage, or to an increasing positive voltage towards the anode-end exhaust port 408. Any number of the portions between adjacent electrodes may be configured as an ionization/separation chamber by appropriately charging the electrodes using a high voltage source 418 connected to a power source 420. For automotive applications, high voltage source 418 may comprise an ignition coil, and power source 420 may comprise the battery and charging system.

An ambient air supply port 424 may be provided in housing 401 of main air intake 402, opening into plenum 405. An adjustable control valve 426 may be configured to control ambient air stream 427. It should be apparent that valve 426 need not be incorporated into housing 401.

Figures 4B, 4C:
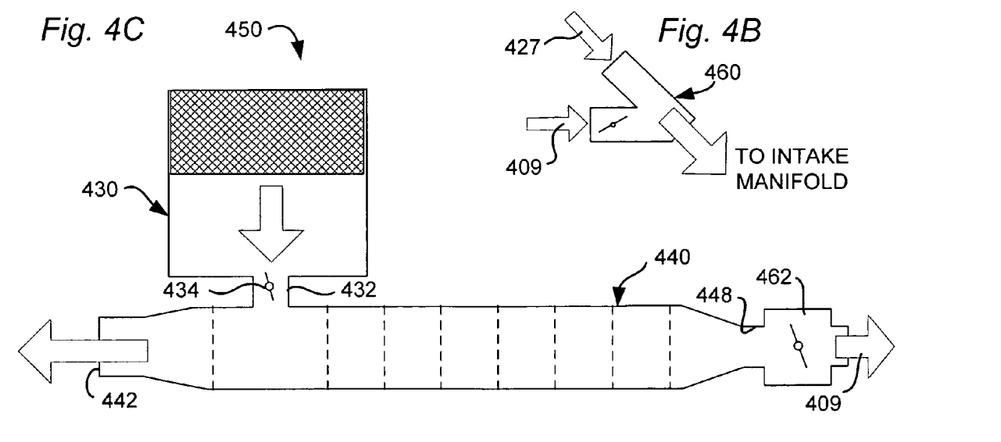
FIG. 4B is a diagram showing an exemplary air metering system.
FIG. 4C is a diagram showing an exemplary combined main air intake and asymmetric oxygen separator for use with a combustion engine, according to an alternative embodiment of the invention.

Ambient air stream 427 and oxygen-enriched air stream 409 may be combined by a downstream air metering system 460, as shown in FIG. 4B. In the alternative, port 424 may be omitted, and all engine air may be drawn from the oxygen-enriched port 408.

Housing 401 may be made from any suitable material, such as any suitable plastic currently used for filter housings. Likewise, housing 422 for container 414 may be made from the same material, or from any similar or compatible material, as housing 401. These materials may include any suitable non-conductive plastic material that will maintain its shape and structural integrity in the heat of the engine compartment.

FIG. 4C shows a combination air intake and oxygen separation system 450 like system 400, differing in that main air intake 430 is connected to oxygen separation unit 440 via a discrete port 432 controlled by an adjustable valve 434. In addition, bypass port 424 and corresponding control valve 426 is not included in system 450.

Valve 434 may be used to maintain a desired pressure and/or flow rate through oxygen separator 440. The presence of a valve may be particularly useful if the amount of suction applied to port 442 and/or port 448 varies under different engine conditions. For example, valve 434 may be opened as engine speed increases, maintaining a relatively constant pressure in separator 440 under different operating conditions.

Oxygen-deficient air may be discharged through exit port 442. An oxygen-enriched stream 409 may be discharged via port 448 to an air metering system 462. Valves 434 and 462 may be controlled in a cooperative fashion to as to maintain desired air flow and optimal pressure in separator system 440 under various operating conditions.

Figure 5:
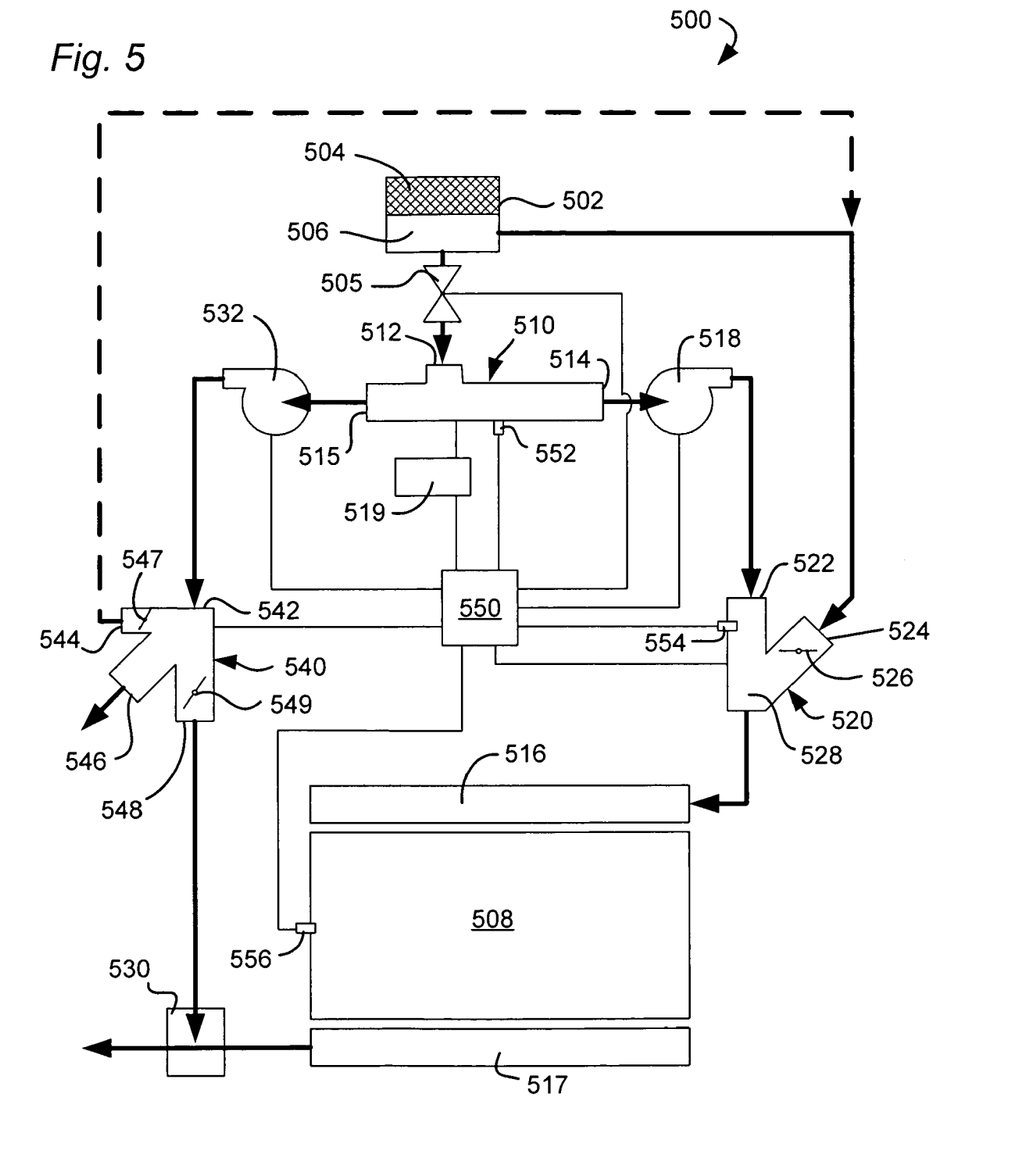
FIG. 5 is a diagram showing an exemplary system for conditioning intake air for an internal combustion engine, incorporating an oxygen separator according to the invention.

FIG. 5 shows an exemplary system 500 for conditioning intake air for an internal combustion engine 508. Air flow is indicated by bold dark arrows. Communication lines between system components are indicated by solid lines of regular weight. System 500 comprises a main air intake 502 through which intake air may be drawn. Air intake 502 optionally includes any suitable air filter 504 and a plenum 506.

Intake air may be drawn into an intake port 512 of oxygen separator 510, which may be of any suitable type described herein. Optionally, an adjustable control valve 505 is placed upstream and in series with intake port 512, to control flow into separator 510. Valve 505 may be continuously adjusted to maintain a desired pressure in separator 510, while the mass flow rate from separator 510 into engine 508 may be allowed to vary according to engine requirements. In the alternative, or in addition, intake port 512 may comprise a plurality of small openings leading from a plenum (such as plenum 506) into the oxygen separation system 510, or any other suitable opening.

A high voltage may be supplied to separator 510 using a high voltage source 519. High voltage source 519 may comprise any suitable high voltage source as known in the art. It may be powered by the engine 508 electrical system. For example, a portion of system 519 may comprise a high-voltage ignition system for engine 508.

Oxygen-enriched air may be drawn from an anode-side exhaust port of separator 510 and into an intake manifold 516 of engine 508. The oxygen-enriched air stream may be drawn directly into the intake manifold by the engine vacuum. In the alternative, any suitable vacuum pump 518 may be interposed between the oxygen separator 510 and intake manifold 516, to boost the amount of suction applied at the anode-side exhaust port 514 of separator 510. Vacuum pump 518 may be driven by its own motor, or may be driven by the engine 508 drive shaft or exhaust pressure, in the manner of a turbocharger or supercharger. Output from the vacuum pump 518 may be at any desired pressure, for example, at or above atmospheric pressure. An output pressure near atmospheric may be advantageous in reducing engine stress and increasing efficiency, as explained above.

In addition, or in the alternative, an air metering system 520 may be interposed between separator 510 and engine intake 516. Air metering system 520 may be used to control the total volume of air and oxygen content of air supplied to engine 508. Metering system 520 may comprise a first intake port 522 for oxygen-enriched air from separator 510, a second inlet port 524 for ambient air from main air intake 502, at least one adjustable control valve 526 to control the relative proportions of air drawn through its inlet ports, and a mixing portion 528 wherein air drawn through the at least two inlet ports 522, 524 may be blended together. In addition, or in the alternative, a stream of oxygen-depleted air may be taken from cathode-side exhaust port 515 of separator 510, and mixed with the oxygen-enriched air from port 514, as engine conditions dictate.

Oxygen-depleted air may be drawn from exhaust port 515 of separator 510 using engine vacuum generated at the exhaust manifold 517 of engine 508. For example, air may be drawn into the exhaust system using a pulsed secondary air injection system ("PAIR system"), a venturi vacuum pump, or any other suitable exhaust-driven pump. In addition, or in the alternative, a vacuum pump 532 may be used to draw air out port 515. Like vacuum pump 518, vacuum pump 532 may be driven by its own motor, or may be driven by the engine 508 drive shaft or exhaust pressure, in the manner of a turbocharger or supercharger. Although air from port 515 may be depleted in oxygen relative to ambient air, it may contain more oxygen than normally is contained in exhaust from engine 508. Hence, the oxygen-depleted air stream may be used to increase the oxygen content in the engine exhaust in a manner similar to injection of ambient air into engine exhaust, the latter practice as known in the art.

It may be desirable to control the flow of oxygen-depleted air from cathode-side port 515 using a diverter 540, having an inlet port 542 and two or more outlet ports 544, 546, and 548. One or more adjustable valves 547, 549 may be used to distribute the oxygen-depleted air between the various outlet ports. One of the outlet ports 544 may direct a portion of the oxygen-depleted air stream into air metering system 520, for blending with the oxygen-enriched stream from port 514. Another outlet port 546 may direct a portion of the oxygen-depleted air stream to the atmosphere. Yet another port may direct a portion of the oxygen-depleted air into the engine exhaust stream, via a pump or other entry port 530. The proportion of oxygen-depleted air sent to various components of system 500 may vary, depending on engine conditions. In the alternative, all of the oxygen-depleted air may be exhausted to atmosphere, or to the engine exhaust, or put to any other desired use or combination of uses.

Selected components of system 500 may be connected and controlled via a system controller 550. Controller 550 may comprise any suitable electronic controller as known in the art. For example, it may comprise any suitable engine control module. There are numerous different ways which may be appropriate for controlling an engine air conditioning system of the type exemplified by system 500. Various alternative control systems may be developed by one of ordinary skill in the art.

Controller 550 may be connected to receive data concerning the state of system components. For example, controller 550 may receive air pressure data from a pressure sensor 552 positioned to sense pressure inside of oxygen separator 510. This pressure may be controlled via a connection to adjustable input valve 505, and/or by controlling suction applied to port 514 and/or port 515. For example, a speed of pump 518 and/or 532 may be controlled. For further example, suction may be controlled by adjusting a valve, such as valve 526 in the air metering system 520, at any suitable point downstream of exhaust port 514 or 515. Controller 550 may further be connected to control and/or to measure the voltage supplied by high voltage source 519 to oxygen separator 510. Regulation of pressure and voltage in separator 510, in turn, may provide control of over the oxygen content of the oxygen-enriched air stream.

The oxygen content of the air stream for supply to engine 508 may also be measured directly. For example, controller 550 may be connected to receive data from an oxygen sensor disposed in air metering system 520. Depending on engine requirements, total air volume and oxygen content may be controlled by suitably adjusting valve 526 to mix the oxygen enriched stream with a desired amount of ambient air. In addition, controller 550 may increase the operating speed of pump 518 and pump 532 to increase the volume and/or extent of oxygen enrichment of treated air supplied to the air motoring system. Controller 550 may also be connected to control the use of the oxygen-depleted air stream via a connection to diverter 540.

Additionally, it may be helpful for controller 550 to receive information as to engine air requirements. For example, engine speed information may be supplied by connection to a suitable tachometer. Likewise, controller 550 may receive information concerning the rate at which fuel is supplied to the engine, and/or determine this rate via a control signal to a fuel pump. Various other modalities are know in the art of engine control, which may be adapted to determine fuel, air and oxygen requirements for engine 508 under different load conditions, and to send appropriate control signals to the components of system 500 to supply a desired volume of air having an optimal oxygen content for the given load condition.

For example, in a naturally aspirated engine system, volumetric efficiency decreases at higher operating speeds. At the same time, at higher speeds and loads, the optimal air/fuel ratio may increase somewhat. Controller 550 may be programmed to increase the oxygen content of air supplied to the engine 508 to compensate for the loss in volumetric efficiency at high speeds, while at the same time adjusting for an optimal air fuel ratio. This may be accomplished, for example, by increasing the proportion of oxygen-enriched air via the air metering system, or by increasing the extent of oxygen enrichment by boosting the voltage supplied to separator system 510. Similar adjustments may be made if the engine inlet air is pressurized, such as by pump 518. One of ordinary skill may develop an appropriate control scheme by calibrating the response of separator system 510 and its associated components to different operating conditions, and by developing algorithms that produce appropriate control inputs in response to measured or determined engine air and fuel requirements. The optimal control scheme will, of course, vary depending on the engine design and application requirements.

For some applications, controller 550 may be omitted, and system 500 may be configured as a self-regulating system. For example, the input voltage to oxygen separator 510 may be held constant, and the anode-side exhaust port 514 may be connected directly to the engine vacuum at the intake manifold 516. The ports 512, 514, 515 of the oxygen separator may be configured so that the oxygen separation system reaches its maximum oxygen output when the engine draws its maximum vacuum. For a given voltage configuration, oxygen output from the oxygen separation system 510 will generally increase as pressure in the ionization chamber is reduced below atmospheric and temperature is reduced. But below a certain optimal pressure, which will vary depending on the design of the oxygen separation system, the mass flow of oxygen decreases as the total oxygen throughput decreases with decreasing pressure. Thus, the system may be designed so that the optimal pressure and temperature is obtained in the oxygen separator—coinciding with maximum oxygen output—when the engine 508 draws its maximum vacuum.

Having thus described a preferred embodiment of a method and system for gas separation, it should be apparent to those skilled in the art that certain advantages of the within system have been achieved. It should also be appreciated that various modifications, adaptations, and alternative embodiments thereof may be made within the scope and spirit of the present invention. For example, an open system for separation of oxygen and nitrogen from air, and method for using the system, have been illustrated, but it should be apparent that the inventive concepts described above may also be applicable to separation of other gaseous constituents from other mixtures. For further example, it should be apparent that a system according to the invention may be used in connection with various different applications, including but not limited to combustion processes such as internal combustion engines, air conditioning, industrial processes and fire suppression.

In addition, exemplary configurations of oxygen separators for use with a combustion engine have been illustrated, but it should be apparent that the inventive concepts described above may also be applicable to oxygen separators with various different configurations suitable for conditioning input air for an internal combustion engine, so as to increase its oxygen content. Still further, a system according to the invention may be used in connection with various different types of internal combustion engines, including those that burn gasoline, diesel, or other fuels, and including those used for all types of both mobile and stationary applications. The invention is defined by the following claims.

What is claimed is:

1. A system for separating oxygen from air so as to enhance oxygen content in an output stream, comprising:
    a substantially sealed container extending between a first exhaust port and a second exhaust port;
    an entry port opening into the container between the first exhaust port and the second exhaust port;
    first, second, and third gas-permeable electrodes disposed across the container, wherein the second gas-permeable electrode is spaced a distance away from the first gas-permeable electrode and the third gas-permeable electrode is spaced a distance away from the second gas-permeable electrode;
    a first container portion in fluid communication with the entry port, wherein the first and second electrodes define opposite ends of the first container portion:
    a voltage source configured to supply a voltage to the first and second gas-permeable electrodes so as to create a first static electric field therebetween; and
    a second container portion in fluid communication with the first container portion and configured to apply a second static electric field to gas therein, wherein the second electrode and the third electrode define opposite ends of the second container portion.

2. The system of claim 1, wherein the first electric field between the first and second electrodes is not greater than about 50 V/inch.

3. The system of claim 1, wherein the entry port is positioned closer to the first exhaust port than to the second exhaust port.

4. The system of claim 1, wherein the entry port is configured to cause expansion of entering gas sufficient for maintaining gas contained in the first container portion at a temperature below 20° C.

5. The system of claim 1, further comprising at least one additional gas-permeable electrode disposed across the container and spaced a distance away from the third gas-permeable electrode.

6. The system of claim 1, further comprising a plurality of spaced-apart gas-permeable electrodes disposed across the container a distance downstream of the third electrode.

7. The system of claim 1, wherein the third electrode is maintained at a positive voltage substantially greater than a most positive one of the first and second electrodes.

8. The system of claim 7, wherein the electric field maintained between the third electrode and the most positive one of the first and second electrodes has a strength of at least 2000 V/in.

9. The system of claim 1, further comprising a voltage supply system connected to the first, second, and third electrodes, the voltage supply system configured to supply the second electrode with a more positive charge than the first electrode, and the third electrode with a more positive charge than the second electrode.

10. A system for separating oxygen from air so as to enhance oxygen content in an output stream, comprising:
    a substantially sealed container extending between a first exhaust port and a second exhaust port;
    an entry port opening into the container between the first exhaust port and the second exhaust port;
    a first container portion in fluid communication with the entry port, the first container portion configured to apply a low-energy ionization energy to gas contained therein;
    a second container portion in fluid communication with the first container portion and separated from the first container portion by at least one gas-permeable electrode, the second container portion configured to apply an electric field to gas contained therein, wherein the at least one gas-permeable electrode comprises one of first and second gas-permeable electrodes disposed across the container so as to define opposite ends of the first container portion;

a refrigeration element in fluid communication with the first container portion and configured to maintain a temperature less than 20° C. in the first container portion;

a voltage source configured to supply a voltage to the first and second gas-permeable electrodes so as to create a static electric field therebetween, the electric field not greater than about 50 V/inch; and at least one additional gas-permeable electrode disposed across the container and spaced a distance away from the second gas-permeable electrode.

11. The system of claim 10, wherein the at least one additional electrode is maintained at a positive voltage substantially greater than a most positive one of the first and second electrodes.

12. The system of claim 11, wherein an electric field having a strength of at least 2000 V/in is maintained between the at least one additional electrode and the most positive one of the first and second electrodes.

13. The system of claim 10, further comprising a voltage supply system connected to the first, second, and third electrodes, the voltage supply system configured to supply the second electrode with a more positive charge than the first electrode, and the third electrode with a more positive charge than the second electrode.

14. The system of claim 10, wherein the entry port is positioned closer to the first exhaust port than to the second exhaust port.

15. The system of claim 10, wherein the entry port is configured to cause expansion of entering gas sufficient for maintaining gas contained in the first container portion at a temperature below 20° C.

16. A system for separating oxygen from air so as to enhance oxygen content in an output stream, comprising:

a substantially sealed container extending between a first exhaust port and a second exhaust port;

an entry port opening into the container between the first exhaust port and the second exhaust port;

a first container portion in fluid communication with the entry port, the first container portion configured to apply a low-energy ionization energy to gas contained therein;

a second container portion in fluid communication with the first container portion and separated from the first container portion by at least one gas-permeable electrode, the second container portion configured to apply an electric field to gas contained therein, wherein the at least one gas-permeable electrode comprises one of first and second gas-permeable electrodes disposed across the container so as to define opposite ends of the first container portion;

a refrigeration element in fluid communication with the first container portion and configured to maintain a temperature less than 20° C. in the first container portion;

a voltage source configured to supply a voltage to the first and second gas-permeable electrodes so as to create a static electric field therebetween, the electric field not greater than about 50 V/inch; and a plurality of spaced-apart gas-permeable electrodes disposed across the container a distance downstream of the second electrode.

17. The system of claim 16, wherein the entry port is positioned closer to the first exhaust port than to the second exhaust port.

18. The system of claim 16, wherein the entry port is configured to cause expansion of entering gas sufficient for maintaining gas contained in the first container portion at a temperature below 20° C.

* * * * *